US012542096B2

(12) United States Patent
Choi et al.

(10) Patent No.: US 12,542,096 B2
(45) Date of Patent: Feb. 3, 2026

(54) DIFFERENT PIXEL REFRESH CHARACTERISTICS AT DIFFERENT REFRESH RATES

(71) Applicant: GOOGLE LLC, Mountain View, CA (US)

(72) Inventors: Sangmoo Choi, Mountain View, CA (US); Hsin-Yu Chen, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/838,267

(22) PCT Filed: Apr. 29, 2022

(86) PCT No.: PCT/US2022/026937
§ 371 (c)(1),
(2) Date: Aug. 14, 2024

(87) PCT Pub. No.: WO2023/211460
PCT Pub. Date: Nov. 2, 2023

(65) Prior Publication Data
US 2025/0157395 A1 May 15, 2025

(51) Int. Cl.
*G09G 3/32* (2016.01)

(52) U.S. Cl.
CPC ....... *G09G 3/32* (2013.01); *G09G 2300/0426* (2013.01); *G09G 2300/0819* (2013.01);
(Continued)

(58) Field of Classification Search
CPC ... G09G 3/32–3291; G09G 2300/0426; G09G 2300/08; G09G 2300/0809;
(Continued)

(56) References Cited

U.S. PATENT DOCUMENTS 11,030,946 B1 6/2021 Chen et al.
2008/0186265 A1 8/2008 Lee
(Continued)

FOREIGN PATENT DOCUMENTS

EP 2306443 4/2011
JP 2011-059648 3/2011
(Continued)

OTHER PUBLICATIONS

Office Action in Korean Appln. No. 10-2024-7032108, mailed on Feb. 11, 2025, 19 pages (with English translation).
(Continued)

*Primary Examiner* — Nathan Danielsen
(74) *Attorney, Agent, or Firm* — Fish & Richardson P.C.

(57) ABSTRACT

In general, the subject matter described in this disclosure can be embodied in methods, systems, and program products for operating a display device. A pixel of a the display device is refreshed while the display device is operating at a first refresh rate, including by: turning off emission of the LED; programming a driving transistor that drives the LED; and turning on emission of the LED a first delay of time after the programming of the driving transistor. The pixel of the display device is refreshed while the display device is operating at a second refresh rate, including by: turning off emission of the LED; programming the driving transistor that drives the LED; and turning on emission of the LED a second delay of time after the programming of the driving transistor.

24 Claims, 10 Drawing Sheets

(52) U.S. Cl.
CPC ............... *G09G 2300/0842* (2013.01); *G09G 2300/0861* (2013.01); *G09G 2310/08* (2013.01); *G09G 2320/0233* (2013.01); *G09G 2320/0247* (2013.01); *G09G 2340/0435* (2013.01)

(58) Field of Classification Search
CPC ... G09G 2300/0819; G09G 2300/0842; G09G 2300/0861; G09G 2310/0243; G09G 2310/0248; G09G 2310/0251; G09G 2310/0267; G09G 2310/06; G09G 2310/08; G09G 2320/0233; G09G 2320/0242; G09G 2320/0247; G09G 2320/0271; G09G 2320/029–04; G09G 2320/0633; G09G 2320/064; G09G 2320/0693; G09G 2320/08; G09G 2340/0435; G09G 2360/14–144
See application file for complete search history.

(56) References Cited

U.S. PATENT DOCUMENTS

| | | | | |
|---|---|---|---|---|
| 2017/0243548 | A1 | 8/2017 | Wang et al. | |
| 2019/0266978 | A1 | 8/2019 | Chaji et al. | |
| 2021/0004053 | A1 | 1/2021 | Shao et al. | |
| 2022/0068221 | A1 | 3/2022 | Ha et al. | |
| 2022/0148506 | A1 * | 5/2022 | Yuan | G09G 3/3233 |

FOREIGN PATENT DOCUMENTS

| | | |
|---|---|---|
| JP | 2017-083813 | 5/2017 |
| JP | 2022-034553 | 3/2022 |
| KR | 10-2018-0059017 | 6/2018 |
| KR | 10-2021-0081505 | 7/2021 |
| KR | 10-2021-0101627 | 8/2021 |
| WO | WO 2021133461 | 7/2021 |
| WO | WO 2022041966 | 3/2022 |

OTHER PUBLICATIONS

International Preliminary Report on Patentability in International Appln. No. PCT/US2022/026937, mailed on Nov. 7, 2024, 11 pages.

International Search Report and Written Opinion in International Appln. No. PCT/US2022/026937, mailed on Dec. 9, 2022, 16 pages.

Office Action in Japanese Appln. No. 2024-556750, mailed on Nov. 11, 2025, 7 pages (with English translation).

* cited by examiner

DIFFERENT PIXEL REFRESH CHARACTERISTICS AT DIFFERENT REFRESH RATES

CROSS-REFERENCE TO RELATED APPLICATION

This is a 35 USC § 371 National Phase Application from PCT/US2022/026937, filed Apr. 29, 2022, the disclosure of which is incorporated herein by reference.

TECHNICAL FIELD

This document generally relates to display devices.

BACKGROUND

Electronic devices can include display devices on which visual images are shown. An electronic device can change a refresh rate at which new image data is provided to and presented by a display panel. A high refresh rate can provide a smoother presentation of content to a user, at expense of additional power consumption with respect to a lower refresh rate.

SUMMARY

This document describes techniques, methods, systems, and other mechanisms for providing a display device in which the refresh characteristics for pixels differ at different refresh rates.

As additional description to the embodiments described below, the present disclosure describes the following embodiments.

Embodiment 1 is a method of operating a display device, comprising: refreshing a pixel of the display device, while the display device is operating at a first refresh rate in which emission of an LED of the pixel remains on for a first period of time, including by: turning off emission of the LED; programming a driving transistor that drives the LED, while the emission of the LED remains off and the display device is operating at the first refresh rate; and turning on emission of the LED a first delay of time after the programming of the driving transistor while the display device is operating at the first refresh rate. The method comprises refreshing the pixel of the display device, while the display device is operating at a second refresh rate in which emission of the LED remains on for a second period of time that is different from the first period of time, including by: turning off emission of the LED; programming the driving transistor that drives the LED, while the emission of the LED remains off and the display device is operating at the second refresh rate; and turning on emission of the LED a second delay of time after the programming of the driving transistor while the display device is operating at the second refresh rate, the second delay of time being different from the first delay of time.

Embodiment 2 is the method of embodiment 1, wherein: the first refresh rate is a 60 Hz refresh rate; and the second refresh rate is a 90 Hz refresh rate or a 120 Hz refresh rate.

Embodiment 3 is the method of any one of embodiments 1 and 2, wherein: the second refresh rate is higher than the first refresh rate, such that the second period of time is shorter than the first period of time; and the second delay of time is greater than the first delay of time.

Embodiment 4 is the method of embodiment 3, wherein: programming the driving transistor while the display device is operating at the first refresh rate includes providing a first voltage to a gate of the driving transistor; the first voltage provided to the gate of the driving transistor decreases a first proportion during the first delay of time after the programming of the LED while the display device is operating at the first refresh rate; programming the driving transistor while the display device is operating at the second refresh rate includes providing a second voltage to the gate of the driving transistor; and the second voltage provided to the gate of the driving transistor decreases a second proportion during the second delay of time after the programming of the LED while the display device is operating at the second refresh rate, the second proportion being a greater proportion than the first proportion as a result of the second delay of time being greater than the first delay of time.

Embodiment 5 is the method of embodiment 4, wherein: the first voltage is same as the second voltage as a result of a same intensity level being programmed to the pixel during both the programming of the driving transistor while the display device is operating at the first refresh rate and the programming of the driving transistor while the display device is operating at the second refresh rate; the LED has a first peak intensity by the upon emission of the LED being turned on after the first voltage is programmed to the gate of the driving transistor while the display device is operating at the first refresh rate; the LED has a second peak intensity upon emission of the LED being turned on after the second voltage is programmed to the gate of the driving transistor while the display device is operating at the second refresh rate; and the first peak intensity of the LED is greater than the second peak intensity of the LED.

Embodiment 6 is the method of embodiment 4, wherein the emission of the LED turns on at a same time that the programming the driving transistor ends, while the display device is operating at the first refresh rate, such that the first delay of time is zero.

Embodiment 7 is the method of any one of embodiments 1-6, wherein:

programming the driving transistor, while the display device is operating at the first refresh rate, includes applying a first voltage to a gate of the driving transistor for a programming period of time; and programming the driving transistor, while the display device is operating at the second refresh rate, includes applying a second voltage to the gate of the driving transistor for same said programming period of time.

Embodiment 8 is the method of any one of embodiments 1-7, wherein: refreshing the pixel of the display device while the display device is operating at the first refresh rate includes: (i) a preceding emission of the LED that immediately precedes a refresh of the pixel at the first refresh rate remains on for the first period of time; and (ii) a following emission of the LED that immediately follows the refresh of the pixel at the first refresh rate remains on for the first period of time; and refreshing the pixel of the display device while the display device is operating at the second refresh rate includes: (i) a preceding emission of the LED that immediately precedes a refresh of the pixel at the second refresh rate remains on for the second period of time; and (ii) a following emission of the LED that immediately follows the refresh of the pixel at the second refresh rate remains on for the second period of time.

Embodiment 9 is the method of any one of embodiments 1-8, wherein: refreshing the pixel of the display device, while the display device is operating at the first refresh rate, includes emission of the LED being off for a refresh period of time; and refreshing the pixel of the display device, while the display device is operating at the second refresh rate, includes emission of the LED being off for same said refresh period of time.

Embodiment 10 is the method of embodiment 9, wherein: the second delay of time is greater than the first delay of time; and the programming of the driving transistor occurs at a first position within the refresh period of time while the display device is operating at the first refresh rate; the programming of the driving transistor occurs at a second position within the refresh period of time while the display device is operating at the second refresh rate; and the first position is located later within the refresh period of time with respect to the second position.

Embodiment 11, is the method of any one of embodiments 1-10, wherein: refreshing the pixel of the display device, while the display device is operating at the first refresh rate, includes emission of the pixel remaining off for a first refresh period of time; and refreshing the pixel of the display device, while the display device is operating at the second refresh rate, includes emission of the pixel remaining off for a second refresh period of time that is greater than the first refresh period of time.

Embodiment 12 is the method of embodiment 11, wherein: the second delay of time is greater than the first delay of time; the programming of the driving transistor begins a waiting period of time after the emission of the pixel turns off while the display device is operating at the first refresh rate; and the programming of the driving transistor occurs same said waiting period after the emission of the pixel turns off while the display device is operating at the second refresh rate.

Embodiment 13 is the method of any one of embodiments 1-10, wherein: programming the driving transistor while the display device is operating at the first refresh rate includes programming the driving transistor for a programming period of time; and programming the driving transistor while the display device is operating at the second refresh rate includes programming the driving transistor for same said programming period of time.

Embodiment 14 is the method of any one of embodiments 1-13, wherein the first delay of time remains different from the second delay of time regardless various levels of ambient light incident upon a computing device in which the display device is included.

Embodiment 15 is the method of any one of embodiments 1-14, wherein: programming the driving transistor while the display device is operating at the first refresh rate is performed after an initializing of the driving transistor to an initialization voltage while the display device is operating at the first refresh rate; and programming the driving transistor while the display device is operating at the second refresh rate is performed after an initializing of the driving transistor to the initialization voltage while the display device is operating at the second refresh rate.

Embodiment 16 is the method of any one of embodiments 1-15, wherein: the first delay of time represents a delay of time after the programming of the transistor ends while the display device is operating at the second refresh rate; and the second delay of time represents a delay of time after the programming of the transistor ends while the display device is operating at the second refresh rate.

Embodiment 17 is a computing device that comprises a display device; and circuitry that accompanies the display device and that is configured to interact with the display device to cause the display device to perform the method of any one of embodiments 1-16.

Embodiment 18 is a method of operating a display panel, comprising: operating a plurality of pixels of the display panel at a first refresh rate; turning on at least a pixel among the plurality of pixels, a first delay of time after providing a signal to a driving transistor of the pixel while the display operates at a first refresh rate; switching operating the plurality of pixels to a second refresh rate, wherein the second refresh rate is higher than the first refresh rate; and turning on the pixel a second delay of time after providing a signal to the driving transistor of the pixel while the display operates at a second refresh rate, the second delay of time being longer than the first delay of time.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
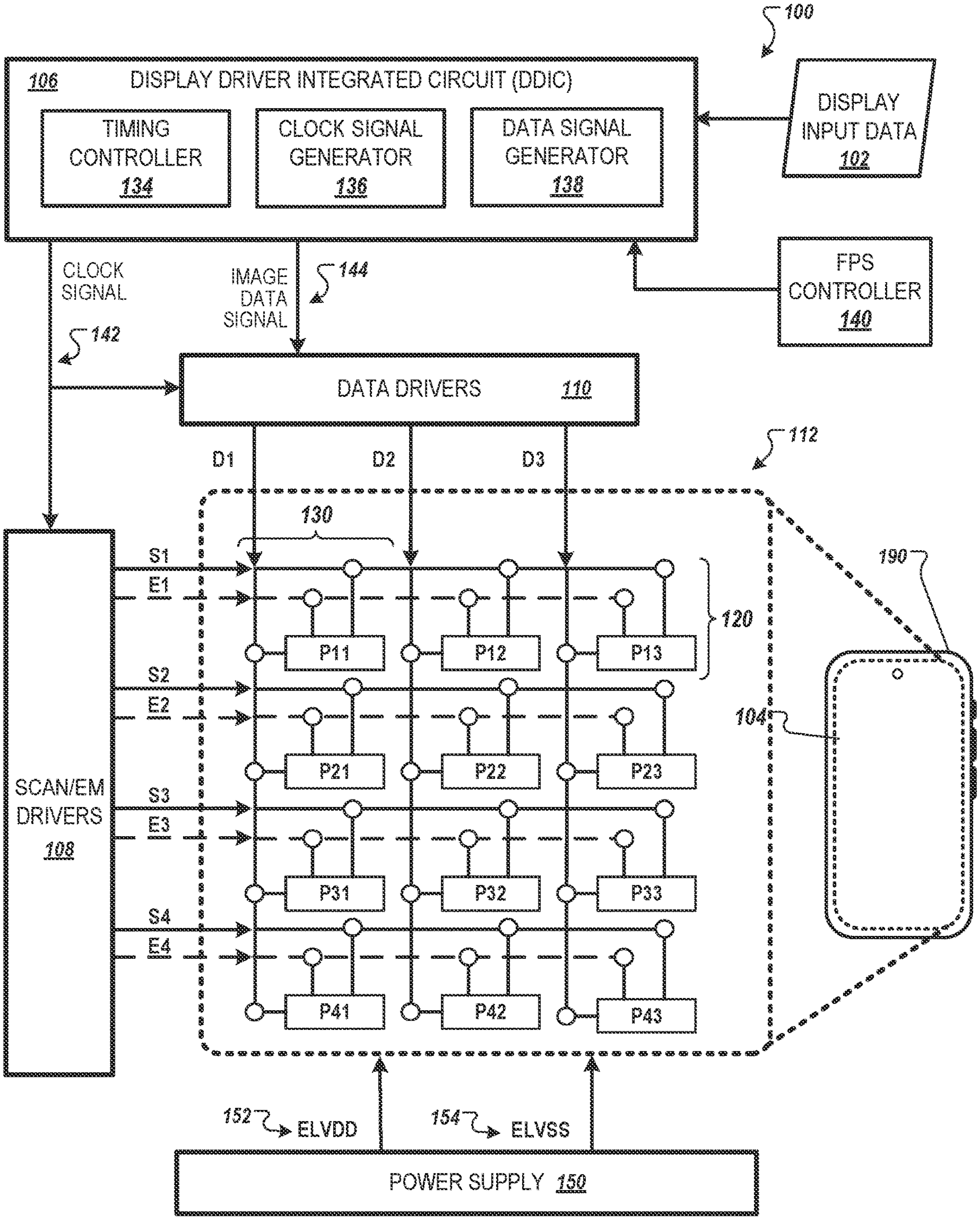
FIG. 1 shows a diagram of an example display system of an electronic device.

This document generally describes mechanisms for providing a display device in which the refresh characteristics for pixels differ at different refresh rates. For example, at different refresh rates, the intensity values programmed that are programmed to pixels may be allowed to decay different periods of time.

Display devices may be configured to operate at different refresh rates (e.g., 60 Hz and 120 Hz). Animated content may present with greater fluidity at a higher refresh rate, while energy consumption may be lower at a lower refresh rate. It is typical for a display device to operate with a higher refresh rate when presenting animated content (e.g., an animation or video), and with a lower refresh rate when presenting static content. (e.g., a static user interface or a picture).

The luminance of pixels in a display device may decay during an emission period of a single frame (e.g., 1/60th of a second, 1/120th of a second). Since a lower refresh rate correlates to a longer emission time and therefore a longer amount of time at a decayed intensity, the average luminance for a given intensity setting may be greater for higher refresh rates than for lower refresh rates. A user may perceive this different intensity as a step change in intensity (e.g., a flicker) of the display device that occurs when the display device changes from one refresh rate to another.

To compensate for this difference, display devices can be tuned or calibrated to output, for a given programmed pixel value, different initial luminances for different refresh rates. As a simple examples, when a display device is operating at its highest refresh rate (e.g., shortest frame time), each pixel's programmed pixel value may be reduced by 5% with respect to operation at a lowest refresh rate.

A problem is that the amount of decay in luminance that occurs during each frame can increase with the presence of strong ambient light. Photons from strong ambient light can interact with semiconductor components within the display device, which can cause current leakage and increased luminance decay. As such, the luminance tuning or calibrating may not as accurately compensate for luminance differences between refresh rates when a display device is in the presence of strong ambient light. This means that an individual that is using their computing device outside on a sunny day may be likely to see occasionally see a "flicker" as their computing device changes refresh rates.

A mechanism to mitigate the effect of ambient light on the intensity of a device with a variable refresh rate can include varying the amount of delay of time for different refresh rates between (1) pixels being programmed with new image data, and (2) those pixels being turned on to emit the image data. During this delay between pixels being programmed (while the pixels are turned off) and the pixels being turned on, the intensity level programmed to each pixel decays.

Allowing the luminance values programmed to pixels to decay a certain period of time before turning those pixels on can result in a reduction in the initial luminance output by pixels of a display device. Also, because the decay is logarithmic, the most-significant changes in luminance between pixel emission in a low-ambient-light environment and pixel emission in a high-ambient-light environment occurs at the beginning of a decay. Thus, implementing different delays in time between programming and emission at different refresh rates can mitigate the appearance of variable refresh rate "flicker" that results from strong ambient light that is incident upon a display device.

The following discussion of the figures provides additional detail regarding such mechanisms to reduce variable refresh rate flicker. The discussion of FIGS. 1 and 2A-B provide an overview of operation a display device and components therein, with FIGS. 3A-8B describing how such components can be operated to mitigate variable refresh rate flicker in the presence of strong ambient light.

Figure 2A:
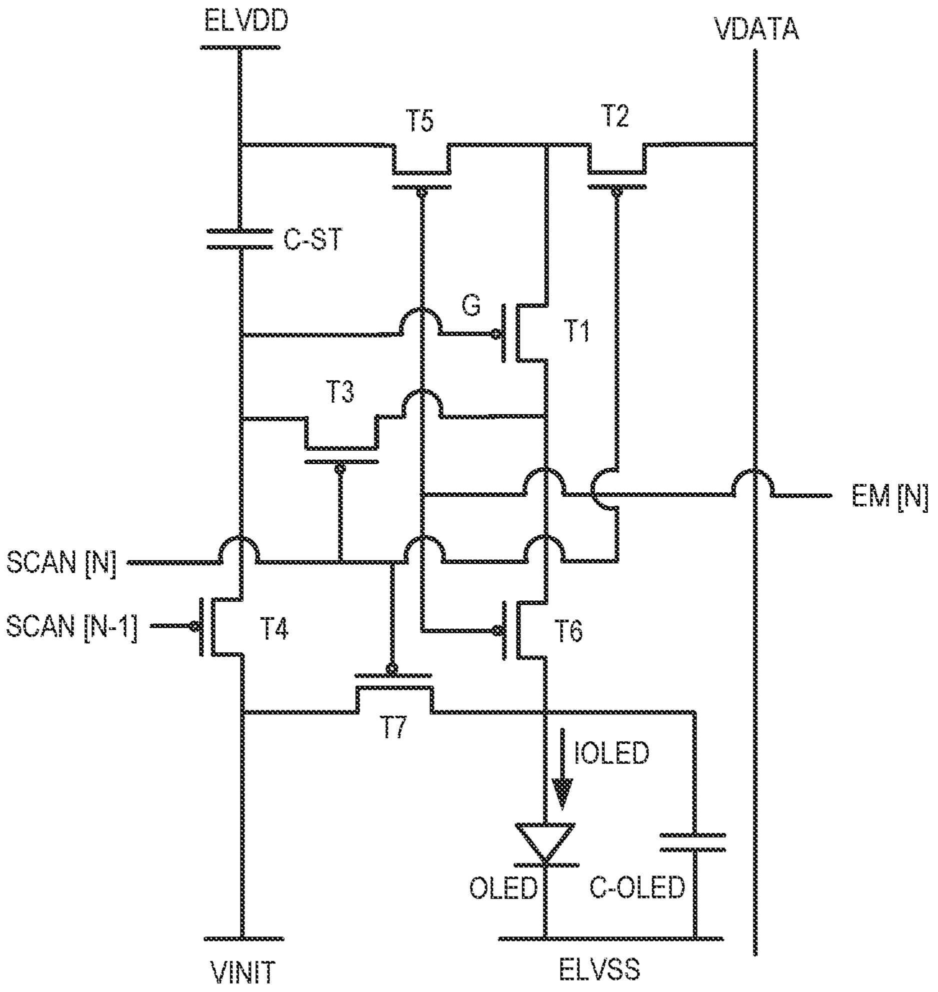
FIGS. 2A-B show a diagram of a pixel circuit of a display device and a corresponding timing diagram.
Figure 2B:
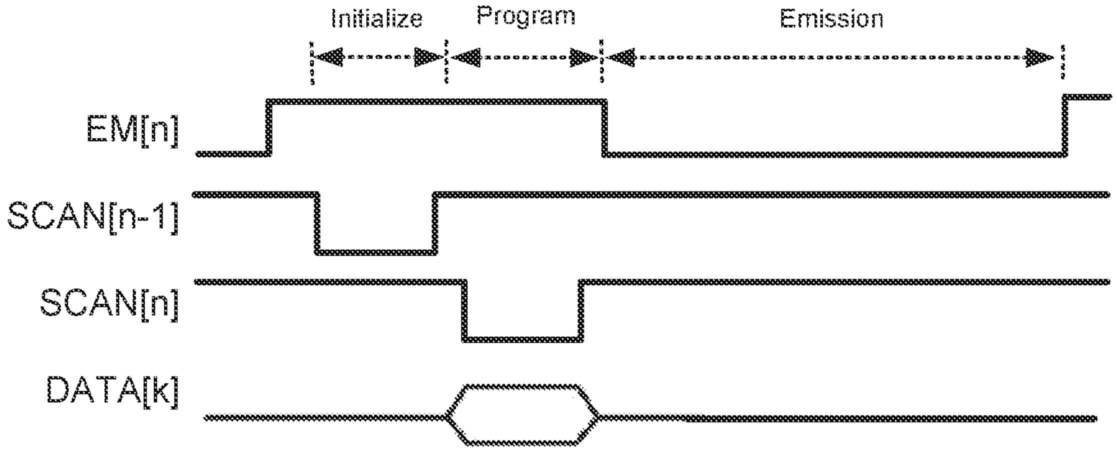

FIG. 1 is a diagram of an example display system 100 of computing device 190. The display system 100 is an OLED display system that includes an array 112 of light emitting pixels. Each light emitting pixel includes an OLED. The OLED display is driven by drivers, including SCAN/EM drivers 108 and data drivers 110. The SCAN/EM drivers 108 can be integrated, i.e., stacked, row line drivers. In general, the SCAN/EM drivers 108 select a row of pixels in the display, and the data drivers 110 provide data signals (e.g., voltage data (VDATA)) to the pixels in the selected row, to light the OLEDs in the selected row according to image data specified by the voltage data. Signal lines such as scan lines, EM (emission) lines, and data lines may be used in controlling the pixels to display images on the display. Although FIG. 1 illustrates the display system 100 having the SCAN/EM drivers 108 on a single side of the display, the SCAN/EM drivers 108 can be placed on both left and right sides of the display to improve driving performance (e.g., speed).

The pixel array 112 includes a plurality of light emitting pixels, for example, the pixels P11 through P43. A pixel is a small element of a display that can change color based on the image data supplied to the pixel. Each pixel includes an OLED and circuitry to address and drive the OLED (e.g., the components shown in FIG. 2A). Each pixel within the pixel array 112 can be addressed separately to produce various intensities of color. Each pixel maintains a mostly steady luminance throughout a frame time, displaying light corresponding to the supplied image data. A frame time, or frame period, is an amount of time between a start of a frame and a start of a next frame. The frame time can be the inverse of a frame rate of a display system. For example, a frame rate of 60 frames per second (fps) corresponds to a frame time of one-sixtieth of a second, or 0.0167 seconds.

The pixel array 112 extends in a plane and includes rows and columns. Each row extends horizontally across the pixel array 112. For example, the first row 120 of the pixel array 112 includes pixels P11, P12, and P13. Each column extends vertically down the pixel array 112. For example, the first column 130 of the pixel array 112 includes pixels P11, P21, P31, and P41. Only a few pixels are shown in FIG. 1 for simplicity. In practice, there may be thousands or millions of pixels in the pixel array 112. Increasing the numbers of pixels in a display that remains the same size results in a higher image resolution.

The display system 100 includes a display driver integration circuit (DDIC) 106 that receives display input data 102. The DDIC 106 can be, for example, a semiconductor integrated circuit or a state machine. The DDIC 106 generates signals with suitable voltage, current, timing, and demultiplexing to cause the display 104 to show images according to display input data 102. In some examples, the DDIC can be a microcontroller and may incorporate RAM, Flash memory, EEPROM, ROM, etc.

The DDIC 106 includes a timing controller 134, a clock signal generator 136, and a data signal generator 138. The DDIC 106 generates a clock signal 142. The clock signal 142 can be, for example, a signal that controls a display frame start time and a display frame stop time of each frame presented by the display panel 104, where a frame represents a single image in a sequence of images that are presented by the display panel 104. In examples in which each frame presented by the display panel includes multiple emission cycles, the clock signal 142 or another signal not illustrated in FIG. 1 can control a display emission start time and a display emission stop time of each emission cycle of the display panel 104. In some examples, the SCAN/EM drivers 108, the data drivers 110, or both, can be integrated with the DDIC 106.

The SCAN/EM drivers supply SCAN and EM signals to rows of the pixel array 112. For example, the SCAN/EM drivers 108 supply scan signals via scan lines S1 to S4, and EM signals via EM lines E1 to E4, to the rows of pixels.

The data drivers 110 supply signals to columns of the pixel array 112. For example, based on the image data signal 144 from the DDIC 106, the data drivers 110 supply data to the columns of pixels via data lines D1 to D3, with data being provided to a single row at a time based on which row is currently selected by the scan/EM signals. For example, the data drivers 110 specify a data voltage for each pixel in a currently-selected row using the according to the image data signal 144. The data drivers 110 apply the selected data voltages via the data lines D1-D3.

The clock signal 142 can be used to drive the SCAN/EM drivers 108 and the data drivers 110. Thus, the DDIC 106 controls the timing of the scan signals, EM signals, and data signals.

The display system 100 includes a power supply 150. The power supply 150 provides a first supply voltage ELVDD and a second supply voltage ELVSS, both of which are applied to each pixel in the pixel array 112. In some examples, the power supply 150 can be integrated with the DDIC 106.

Each pixel in the pixel array 112 is addressable by a horizontal scan line, a horizontal EM line, and a vertical data line. For example, the pixel P11 is addressable by the scan line S1, the EM line E1, and the data line D1. In another example, the pixel P32 is addressable by the scan line S3, the EM line E3, and the data line D2.

The SCAN/EM drivers 108 and the data drivers 110 provide signals to the pixels that enable the pixels to produce an image on the display. The SCAN/EM drivers 108 and the data drivers 110 provide the signals to the pixels via the scan lines, the emission lines, and the data lines. To provide the signals to the pixels, the SCAN/EM drivers 108 select a scan line and control the emission operation of the pixels. The data drivers 110 provide data signals to the pixels addressable by the selected scan line to light the selected OLEDs at intensities specified by the image data.

The scan lines are addressed sequentially for each frame. A scan direction determines an order in which the scan lines are addressed. In the display system 100, the scan direction is from a top of the pixel array 112 to a bottom of the pixel array 112. For example, the scan line S1 is addressed first, followed by the scan line S2, then S3, etc.

While FIG. 1 illustrates that each row is addressed by a single scan line and a single emission line, each row may be addressed by multiple scan lines (e.g., nSCAN and pSCAN). Although FIG. 1 illustrates example components of an OLED display, the described techniques may be applied to other flat panel display technologies that include an array of pixels. For example, the technology may be applied to light emitting diode (LED), liquid crystal displays (LCD), and plasma display panels (PDP).

FIG. 2A shows a diagram of a pixel circuit of a display device, which pixel circuit includes an LED and corresponding drive circuitry for the pixel circuit. For example, FIG. 2A may illustrate a more detailed view of a single pixel from the array of pixels shown in FIG. 1. While this disclosure sometimes refers to the components shown in FIG. 2A as a "pixel circuit", this disclosure may also refer to such components as simply a "pixel." Further, the pixel shown in FIG. 2A can represent a sub-pixel.

The pixel circuit may be an active matrix OLED (AMOLED) pixel circuit. The pixel circuit receives an emission signal EM, SCAN signals, and a data voltage VDATA signal. The pixel circuit 200 receives a first supply voltage ELVDD, a second supply voltage ELVSS, and an initial reference voltage VINIT.

The pixel circuit includes an organic light-emitting diode (OLED). The OLED includes a layer of an organic compound that emits light in response to an electric current, IOLED. The organic layer is positioned between two electrodes: an anode and a cathode. The OLED is driven by a driving transistor T1, which receives the supply voltage ELVDD and acts as a current source that drives the OLED to emit light.

The pixel also includes a storage capacitor C-ST and transistors T2 through T7. The operation of the pixel is defined by states of the control signals SCAN, EM, and VDATA. The OLED current, IOLED, is set by a voltage present at a gate terminal of the driving transistor T1, which is referred to as the "G" node. For example, the driving transistor T1 has a threshold voltage VTH between the gate terminal of the driving transistor T1 and a source terminal of the driving transistor T1, and a voltage between the gate terminal and the source terminal that is above the threshold voltage VTH causes the driving transistor T1 to create a conducting path from the source terminal to the drain terminal.

FIG. 2B shows a timing diagram of the control signals for the pixel shown in FIG. 2A. These control signals repeatedly transition during operation of the display device 100 between an initialization stage, a programming stage, and an emission stage.

At an end of an emission stage, the EM signal transitions to an off state (e.g., by changing from a low state to a high state). This transition turns off transistors T5 and T6, which interrupts current being provided from ELVDD to the OLED, therefore stopping light emission by the OLED.

During the initialization stage, the SCAN[n−1] signal turns to an on state (e.g., by changing form a high state to a low state), which turns on transistor T4 for a period of time and initializes the G node to the initialization voltage VINIT. The SCAN[n−1] signal may be the SCAN[n] signal provided to a preceding row by a state machine of the SCAN/EM drivers 108.

During the programming stage, the SCAN[n] signal turns to an on state (e.g., by going low), which turns on transistors T2, T3, and T7 for a period of time. This causes the voltage value at the voltage data VDATA line to pass through transistors T2, T1, and T3 to the G node, setting the G node to a value based on the VDATA line (e.g., the voltage at VDATA minus an effect of transistor threshold voltages).

During the emission stage, the EM signal turn to an on state (e.g., by going low), which turns on transistors T5 and T6. Current flows from ELVDD through transistors T5, T1, and T6 to an anode of the OLED, with a current level being determined by the voltage present at the G node. Thus, after the pixel has transitioned to the emission stage of the frame, a level of the current IOLED that flows through the OLED is based on the voltage set at the G node of the driving transistor (e.g., with the G node voltage level having been programmed by the voltage data VDATA line). An intensity or brightness of light emitted by the OLED directly correlates to an amount of electrical current IOLED applied to the OLED, with higher current corresponding to a greater intensity of light than a lower current. The storage capacitor C-ST maintains the voltage at the G node, so that the OLED continues to emit light at roughly the same level for a duration of the emission stage.

The voltage at the G node may decrease slightly during the emission stage. As such, the current IOLED applied to the OLED and the intensity of light emitted by the OLED may decrease slightly during the emission stage.

Figure 3A:
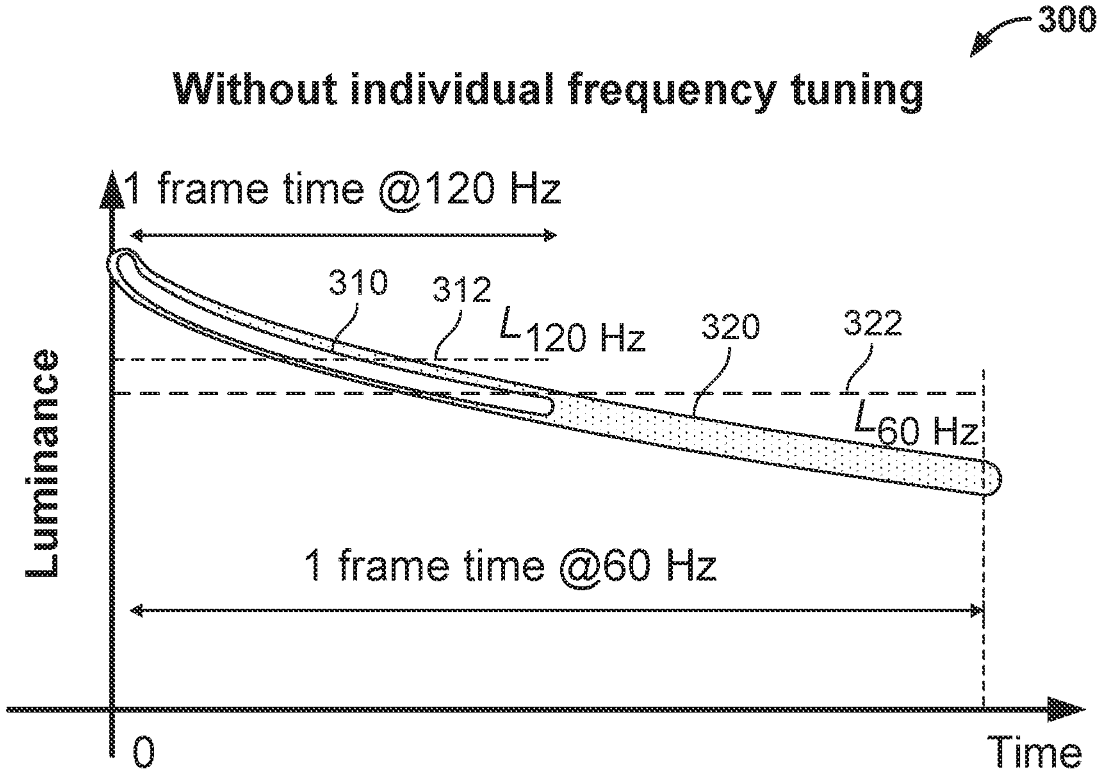
FIGS. 3A-B show luminance of pixels over a single frame time, for different refresh rates.
Figure 3B:
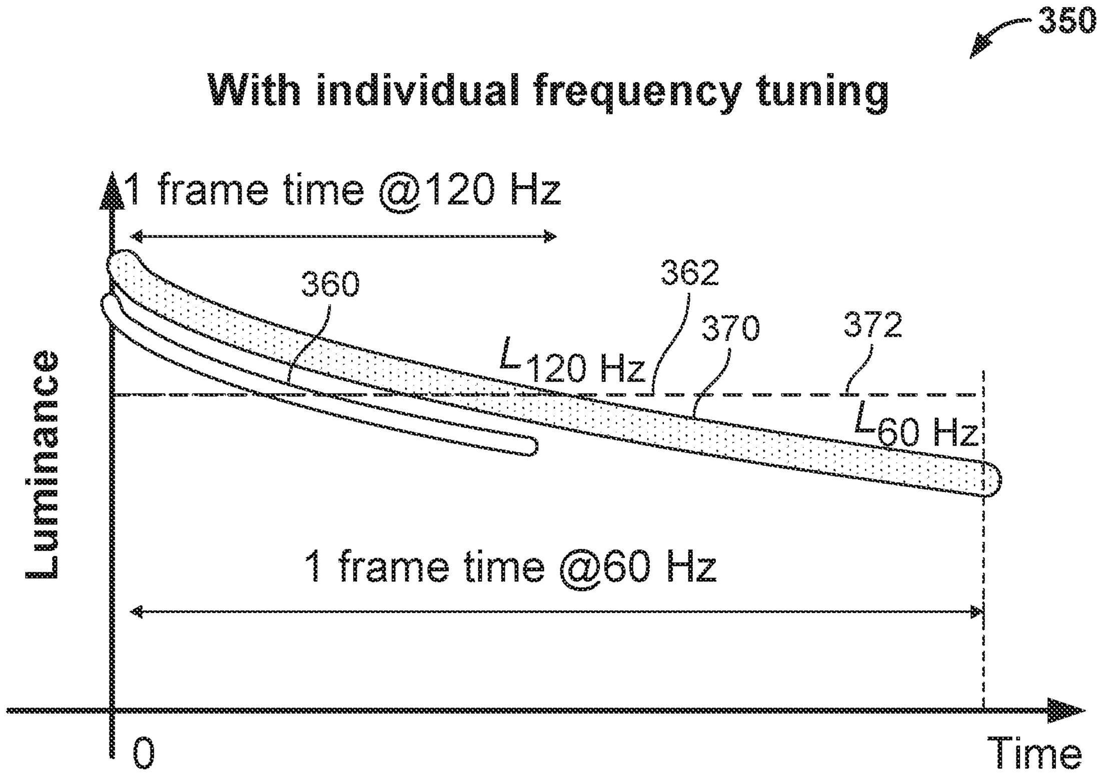

FIGS. 3A-B show the luminance of pixels over a single frame time, for different refresh rates. As previously mentioned, displays of computing devices sometimes support multiple refresh rates. For example, high refresh rates (e.g. 120 Hz, 90 Hz) may be used for moving images to provide high display performance, while low refresh rates (e.g. 60

Hz or lower) may be used for still images or moving images that are slow. In this way, a computing device can both provide high quality user experience and good battery life, optimizing the refresh rate to the content being presented.

The luminance provided by pixels of display devices may decay during emission of each frame time. Due to this non-ideal (non-flat) luminance response of displays over a frame time, there can be a luminance delta between refresh rates. This delta is illustrated in FIG. 3A, which shows a luminance graph 300 that illustrates the luminance of a pixel programmed to a certain intensity value (e.g., full intensity) over the emission period of a single frame time.

In graph 300, a first pixel luminance 310 that occurs during a 120 Hz refresh rate results in a first average luminance intensity 312 over a 120 Hz frame time, while a second pixel luminance 320 that occurs during a 60 Hz refresh rate results in a second average luminance intensity 322 over a 60 Hz frame time. The second average luminance intensity 322 is lower than the first average luminance intensity 312. This difference in average luminance intensity appears as a refresh rate transitional flicker (also called variable refresh rate flicker or VRR flicker) when the system transitions from one refresh rate to another.

Display devices are often tuned or calibrated so that pixels output, at different refresh rates, different initial luminance levels for the same given image data, in order to mitigate VRR flicker. FIG. 3B shows a luminance graph 350 in which a first pixel luminance 360 that occurs during a 120 Hz refresh rate is tuned or calibrated to begin its emission during a frame at a lower intensity value than a second pixel luminance 370 that occurs during a 60 Hz refresh rate, even though both pixel luminance may be presenting the same image data, just at different periods in time.

This can result in a first average luminance intensity 362 at the 120 Hz refresh rate that corresponds to (e.g., is same as) a second average luminance intensity 372 at the 60 Hz refresh rate. For example, if a video to be output by the display device is such that a given pixel is to continuously output at exactly the same intensity level (e.g., 52% intensity), the refresh rate calibration may cause display device circuitry to lower the value programmed to the given pixel when the display device operates at 120 Hz, to mitigate VRR flicker. In other words, refresh-rate specific amplitude control may be employed to mitigate VRR flicker.

Figure 4A:
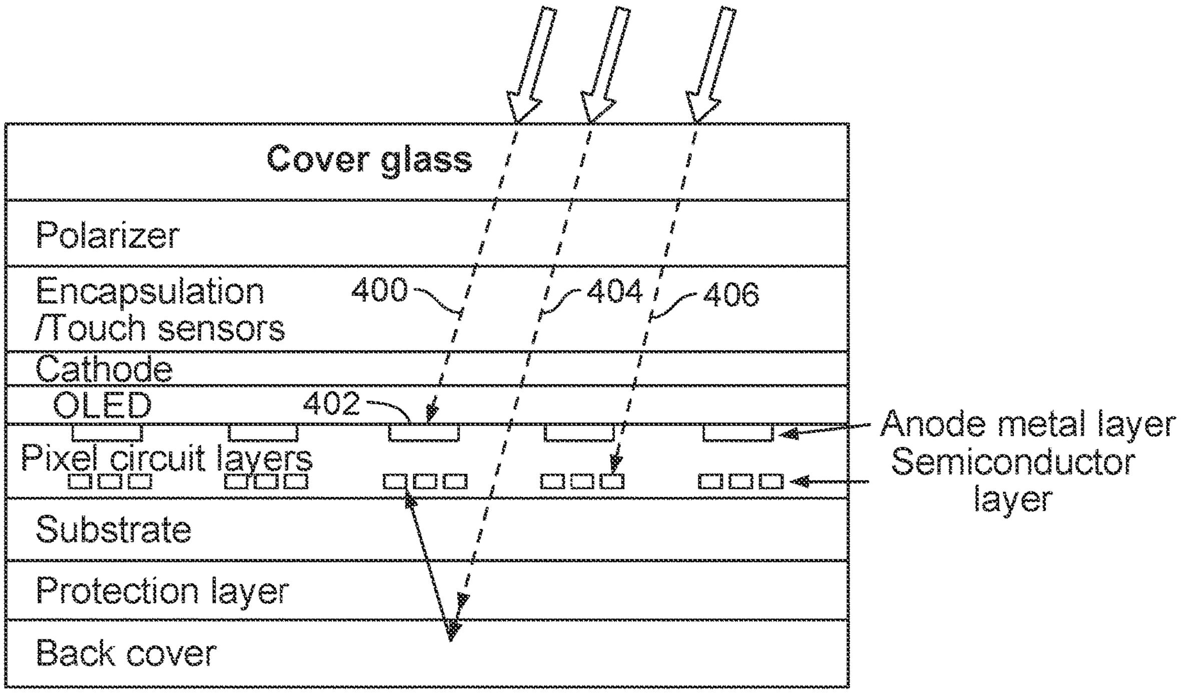
FIG. 4A shows how pixel transistors can be optically shielded.

Transistors in pixels that control individual pixel emission current/luminance (e.g., T1 and/or other transistors in FIG. 2A) may be photosensitive. For example, upon incidence of strong light, the off-state leakage current may increases. As shown in FIG. 4A, the pixel transistors may be optically shielded from strong light shining from a front side of the display (e.g., with photon 400 being blocked by component 402). The optical shield, however, may not provide adequate protection at all angles (e.g., as shown with photon 406 that bypasses any optical shield), and there may also be backside reflected light (e.g., as shown with photon 404). As such, the pixel emission current, IOLED, can decrease when the display is exposed to a strong ambient light.

Figure 4B:
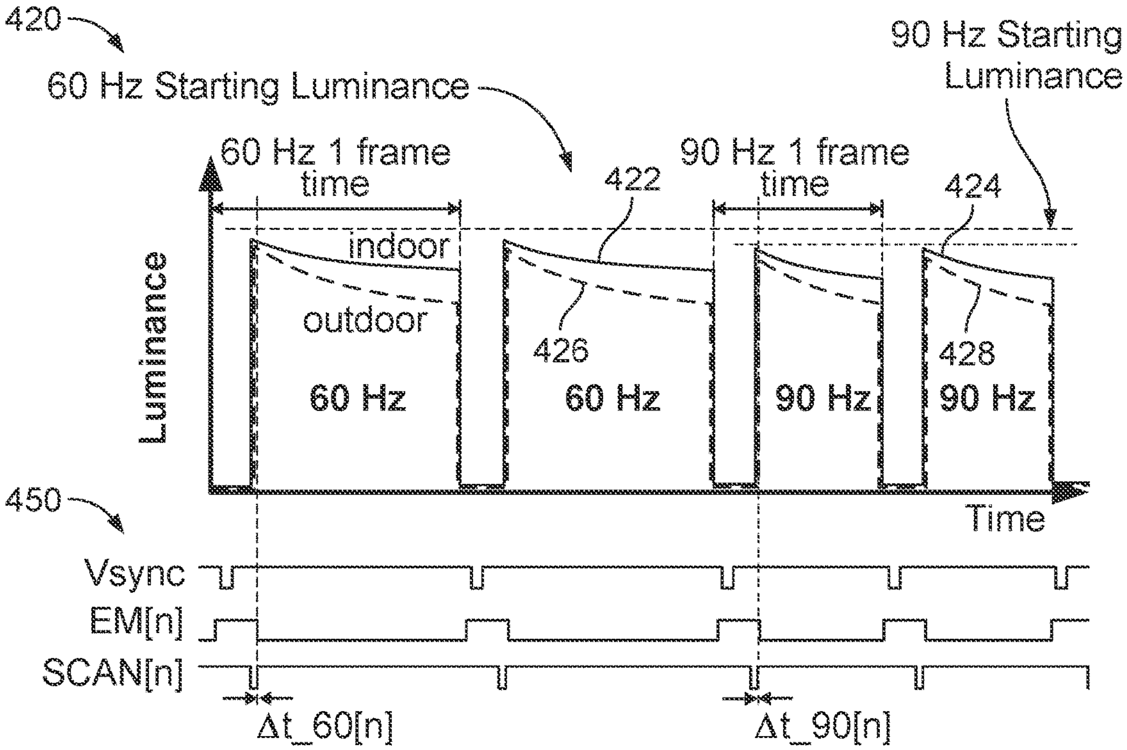
FIG. 4B shows a luminance graph and a corresponding timing diagram.

FIG. 4B shows a luminance graph 420 and a corresponding timing diagram 450. The luminance graph 420 illustrates how (1) an initial intensity for a first luminance profile 422 at a 60 Hz refresh rate and under indoor light conditions is greater than (2) an initial intensity for a second luminance profile 424 at a 90 Hz refresh rate and under indoor light conditions. The lower initial intensity for the second luminance profile 424 is due to tuning or calibration applied by the computing device to produce a same average intensity for both luminance profiles 422 and 426.

The luminance graph 420 also illustrates how (1) an initial intensity for a third luminance profile 426 at a 60 Hz refresh rate and under outdoor light conditions is greater than (2) an initial intensity for a fourth luminance profile 428 at a 90 Hz refresh rate and under outdoor light conditions. The luminance profiles for the outdoor light conditions decay at a faster rate than the indoor light conditions. As described previously, this faster decay results in different average intensity levels when the display device is in outdoor light conditions. For example, the tuning or calibration may have been developed for indoor light conditions and may not fully mitigate VRR flicker during outdoor light conditions (or other types of light conditions that differ from those for which the tuning or calibration was developed).

The timing diagram 450 in FIG. 4B is similar to the timing diagram in FIG. 2B, with a main difference being that the timing diagram 450 shows a Vsync signal, which may transition to a different state once each frame to synchronize various signals. For example, the EM signal may trigger off the Vsync signal, occurring a designated period before or after a transition of the Vsync signal. Similarly, the SCAN signal may trigger off the Vsync signal.

The timing diagram 450 denotes Δt_60[n], which represents a time delay between a programming of a pixel and a beginning of an emission period for that pixel, when the display device is operating with a 60 Hz refresh rate. Specifically, the Δt_60[n] period may begin when a programming of the pixel is complete or ends (as designated by the SCAN[n] pulse ending), and the Δt_60[n] period may end when the emission period begins (as designated by the EM [n] pulse beginning, which is performed with a falling transition in FIG. 4B). The timing diagram 450 also denotes Δt_90[n], which represents a time delay between a programming of the pixel and a beginning of an emission period for that pixel, when the display device is operating with a 90 Hz refresh rate. In this example, Δt_60[n] and Δt_90[n] are the same, for example, because the SCAN[n] signal pulses at the same position within the "off" portion of the EM signal during both 60 Hz and 90 Hz refresh rates. Stated another way, the time gap between the Vsync signal and the SCAN signal is same for both a high and low refresh rates.

The luminance decay during pixel emission is at least partially a result of the transistor T3 (see FIG. 2B) leaking current after VDATA is programmed to the pixel (e.g., after T3 becomes off). As such, regardless whether or not the pixel is emitting light, the G electrode voltage begins to decay once the VDATA programming period ends (e.g., when the VSYNC pulse finishes).

Accordingly, an initial luminance value for a pixel may be lowered by instituting a time delay between (1) an end of VDATA being programmed to the pixel, and (2) pixel emission being turned on. When this time delay greater for a high refresh rate (e.g., 90 Hz) than a low refresh rate (e.g., 60 Hz), the luminance delta between the high and low refresh rates under strong ambient light is mitigated. In other words, a display device that is configured to institute different such time delays at different refresh rates and that is tuned or calibrated to mitigate VRR flicker under indoor light conditions may provide modest or no discernable VRR flicker under outdoor light conditions.

Figure 5A:
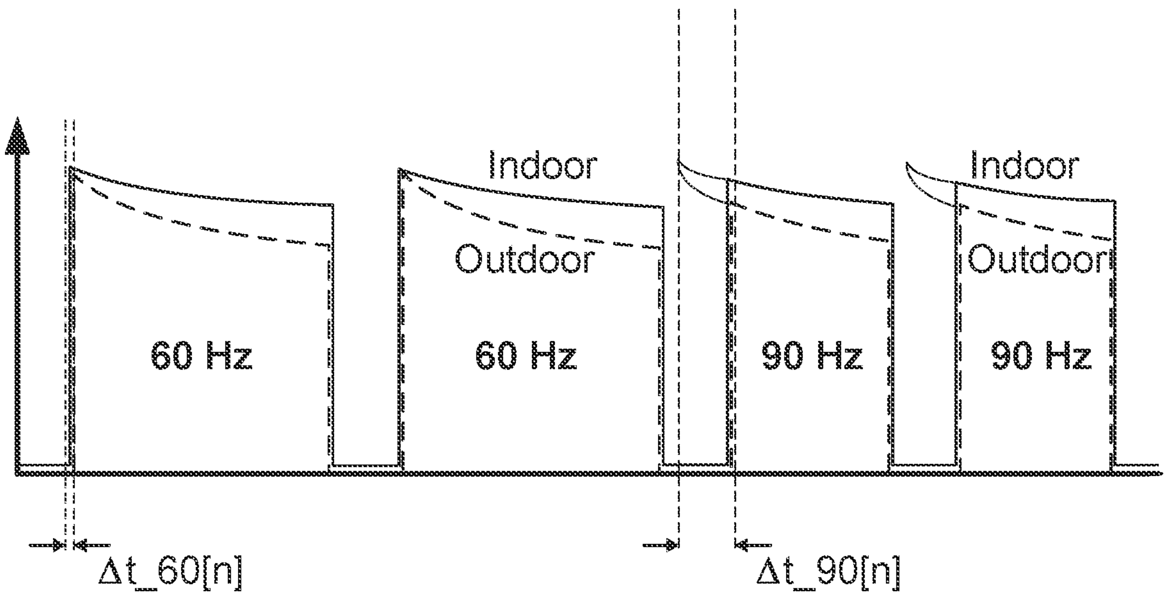
FIG. 5A shows a luminance graph for indoor and outdoor operation.

The use of different time delays is shown in FIG. 5A by the different periods of delay Δt_60[n] and Δt_90[n]. Because of the greater time delay at 90 Hz, the initial luminance value at 90 Hz differs between indoor and outdoor light conditions. A result of instituting this greater time delay is that the average luminance at a 90 Hz refresh rate under outdoor conditions more closely matches the average luminance at a 60 Hz refresh rate under outdoor conditions, than had the time delays at the different refresh rates been the same.

The 90 Hz time delay Δt_90[n] may be implemented regardless of detection by the computing device of a level of ambient light. In other words, the 90 Hz time delay Δt_90[n] may be implemented for all 90 Hz refresh rates. If the computing device detects a level of ambient light, that information may not be used in selecting when to implement the 90 Hz time delay Δt_90[n]. In some examples, the 60 Hz time delay Δt_60[n] is negligible or equal to zero, such that the emission period begins at the same time (or even before) an end to the SCAN programming period.

Figure 5B:
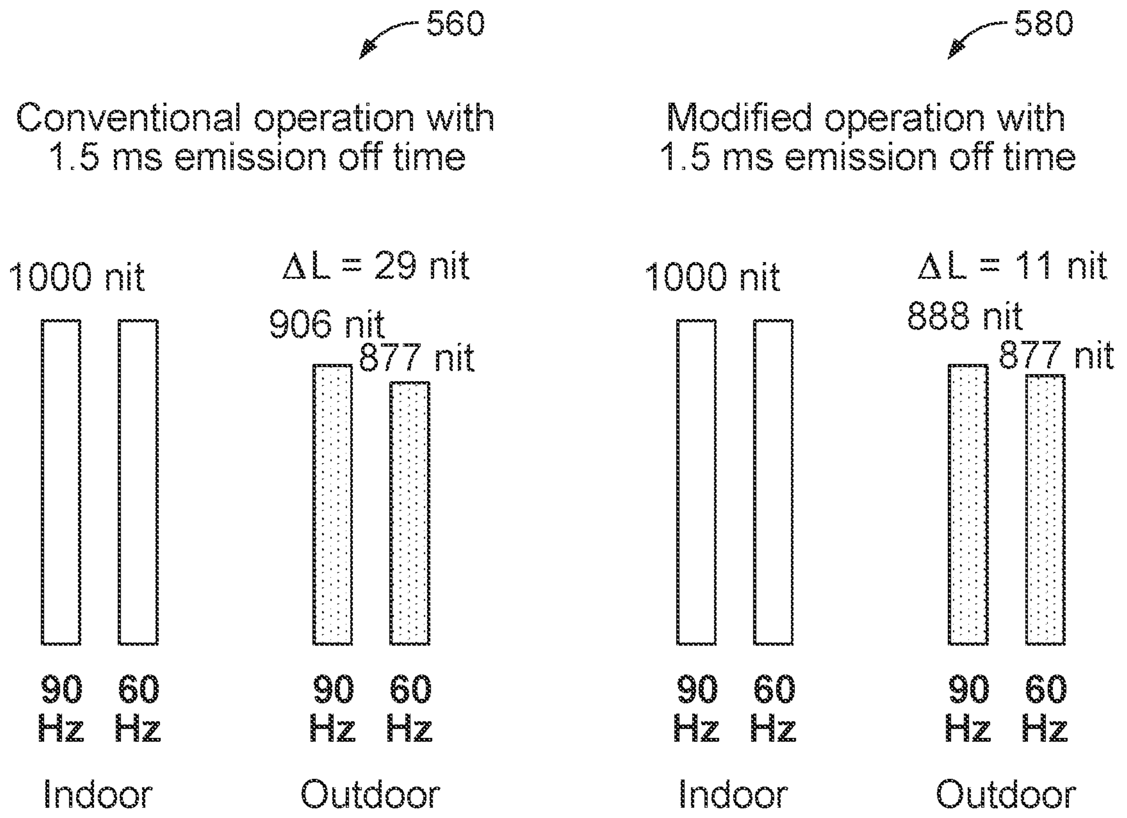
FIG. 5B shows charts that illustrate luminance at different refresh rates and environmental settings.

FIG. 5B includes a first set of graphs 560 that illustrate how a display device that has same refresh characteristics at different refresh rates has a 29 nit luminance difference between the different refresh rates during outdoor operation. FIG. 5B includes a second set of graphs 580 that illustrate how a same display device, with modified operation as described above to have different refresh characteristics at different refresh rates (e.g., different Δt_60[n] and Δt_90[n]), has an 11 nit luminance difference between the different refresh rates during outdoor operation. The smaller nit luminance difference with the modified operation results in less-perceptible flicker under strong ambient light conditions.

Figure 6A:
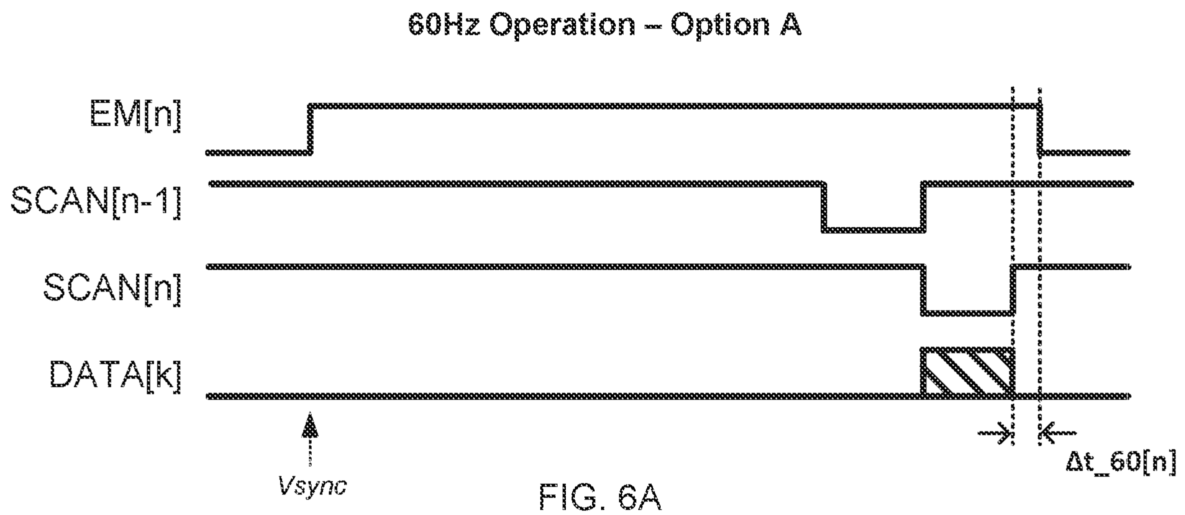
FIGS. 6A-C show timing diagrams that result in different time delays at different refresh rates.

FIG. 6A shows a timing diagram for a pixel or row of a display device, when that display device is operating with a refresh rate of 60 Hz. In this figure, Δt_60[n] indicates a time delay between an end to programming data to the pixel or row and a beginning of an emission period.

Figure 6B:
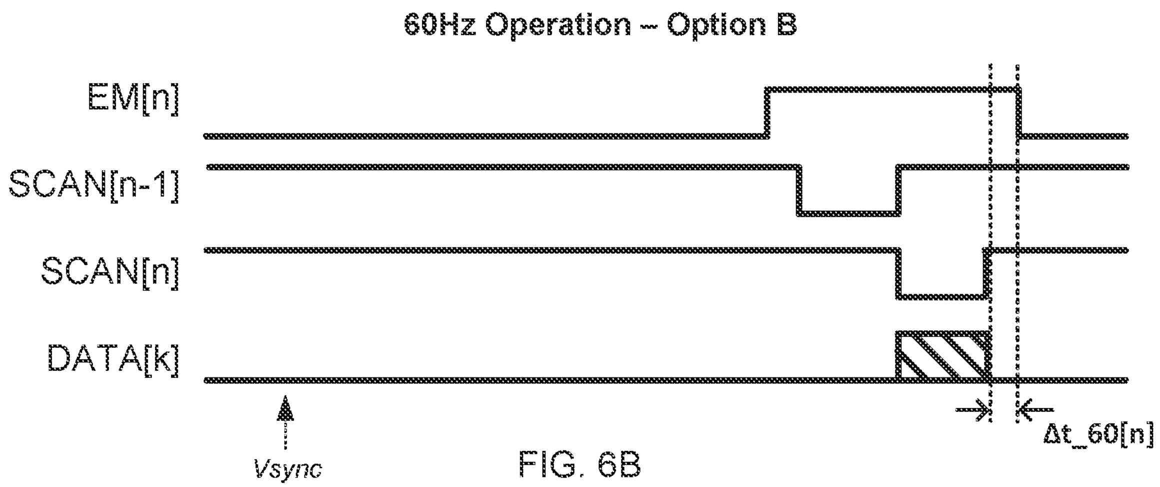
Figure 6C:
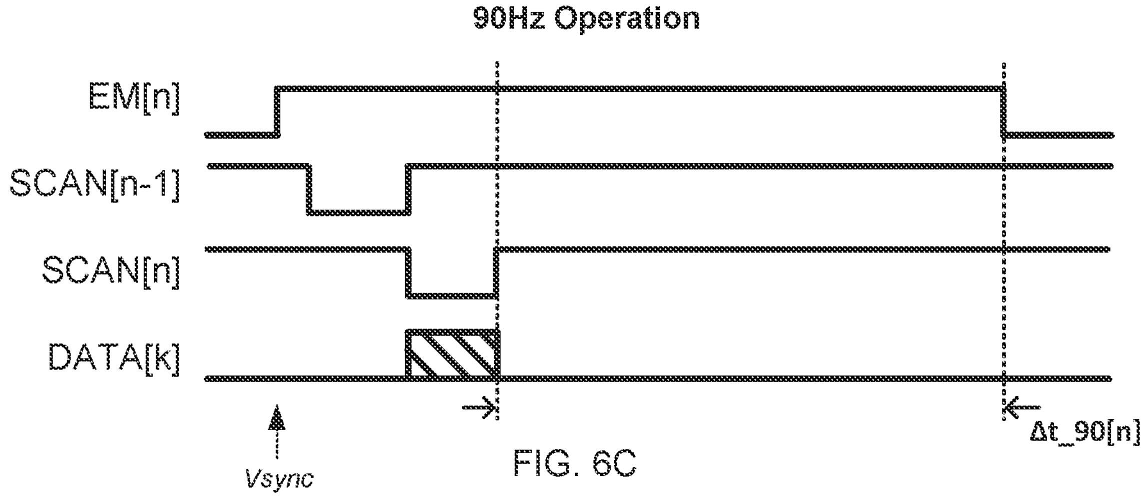

FIG. 6C shows a timing diagram for the same pixel or row of the display device, when that display device is operating with a refresh rate of 90 Hz. In this figure, Δt_90[n] indicates a time delay between the end of the programming of the data and the beginning of the emission period. The luminosity illustrated in FIG. 5A may be achieved by operating with the timing schemes shown in FIGS. 6A and 6C, for 60 Hz and 90 Hz, respectively. Different refresh rates may be used.

As illustrated by FIGS. 6A and 6C, the timing delay at 90 Hz is greater than the timing delay at 60 Hz, which results in the voltage programmed to the G node decaying more, before emission begins, at 90 Hz than at 60 Hz. Use of these two different timing schemes is achieved with a same refresh period (e.g., a same period in which emission of the pixel or row of pixels is off), but with the 90 Hz SCAN programming pulse occurring earlier in the refresh period than with the 60 Hz refresh period.

Alternatively a display device may use the timing scheme of FIGS. 6B and 6C together at the 60 Hz and 90 Hz refresh rates, respectively. With this combination of timing schemes, the 90 Hz time delay Δt_90[n] is still greater than the 60 Hz time delay Δt_60[n], but the refresh periods are of different length. In this example, the SCAN programming pulse during both 60 Hz and 90 Hz refresh periods begins a same length of time after the respective refresh periods begin, but the 60 Hz refresh period is shorter than the 90 Hz refresh period.

Figure 7A:
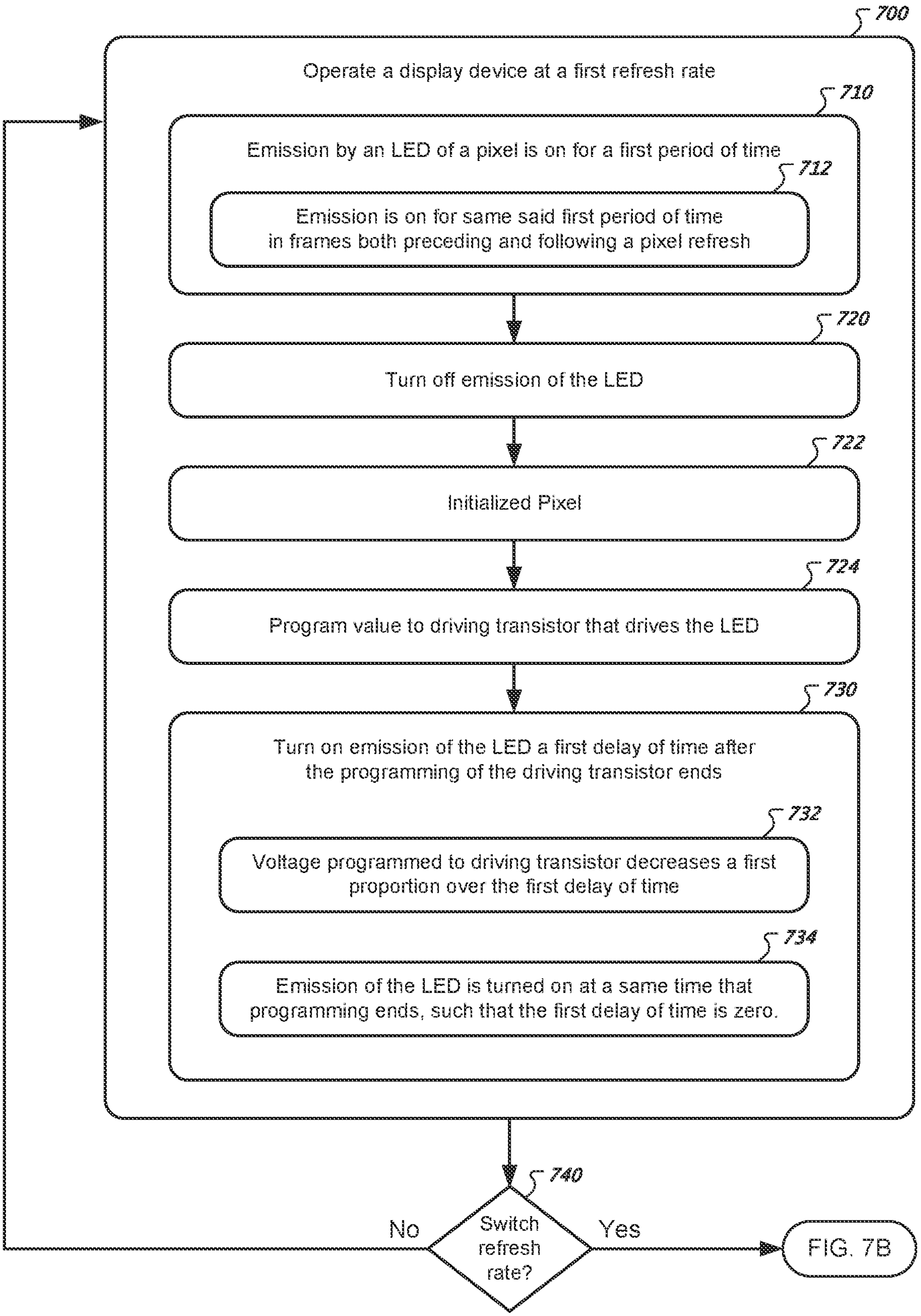
FIGS. 7A-B show a flowchart of a process for operating a display device with different pixel refresh characteristics at different refresh rates
Figure 7B:
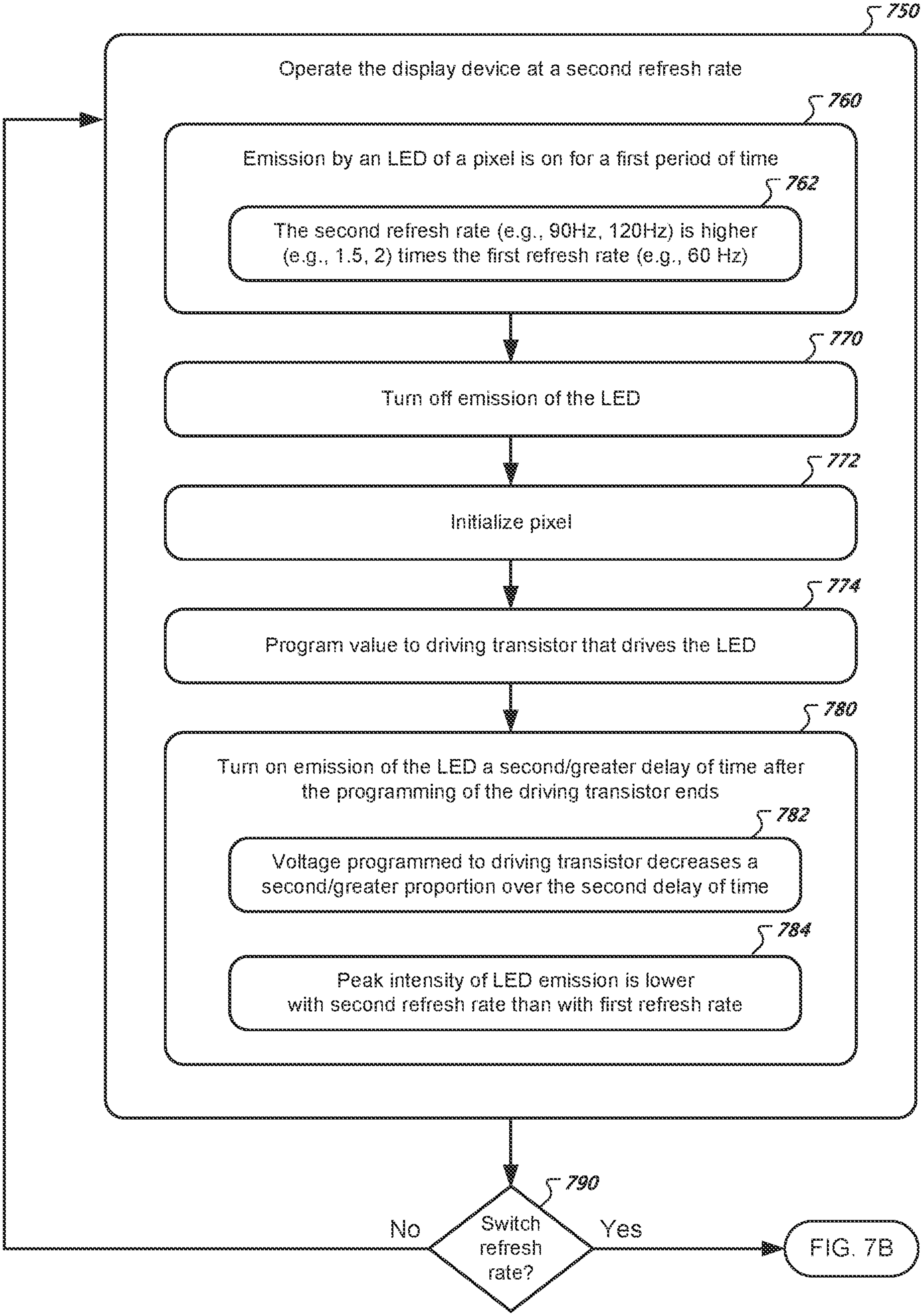

FIGS. 7A-B show a flowchart of a process for operating a display device with different pixel refresh characteristics at different refresh rates. The process may be implemented by a display device or a computing device that includes the display device, for example, to achieve the luminance output illustrated by FIG. 5A and the set of tables 580 in FIG. 5B.

At box 700, a display device operates at a first refresh rate. For example, the display device described with respect to FIGS. 1 and 2A-B can operate at a 60 Hz refresh rate, repeatedly presenting frames, which each include an initialize period, a program period, and an emission period (as shown in FIGS. 2B, 6A, and 6B).

At box 710, emission of an LED of a pixel is on for a first period of time. For example, Pixel P11 (FIG. 1) may be on for the emission period that is labeled in FIG. 2B, and that is shown without a label in FIGS. 6A-B.

At box 712, the emission of the pixel is on for a same period of time in frames that precede and follow a pixel refresh. For example, the pixel refresh that is shown in FIG. 2B (which includes an initialize period and a programming period) may be preceded by an emission period and followed by an emission period that are of a same length. The frame may repeat hundreds of times in sequence with the same emission period, as a result of the display device continuously operating at a same refresh rate for an extended period of time. Similar operations are shown by the timing diagrams of FIGS. 6A-B.

At box 720, emission of the LED of the pixel is turned off. For example, the EM signal (see FIG. 2B) turns "off" by transitioning from low to high. This signal transition causes the LED to stop emitting light, as explained in the description of FIGS. 2A-B. Similar operations are shown by the timing diagrams of FIGS. 6A-B.

At box 722, the pixel is initialized. For example, the SCAN[n−1] signal (see FIG. 2B) may initialize various components of the pixel, as described with respect to FIGS. 2A-B. Similar operations are shown by the timing diagrams of FIGS. 6A-B.

At box 724, a value is programmed to a driving transistor that drives the LED. For example, the DATA signal (FIG. 2B) may be sent by the VDATA line to the G node of the T1 transistor (FIG. 2A), as described with respect to FIGS. 2A-B. Similar operations are shown by the timing diagrams of FIGS. 6A-B.

At box 730, emission of the LED is turned on a first delay of time after the programming of the driving transistor ends, as described with respect to FIGS. 2A-B. Different examples of such a delay in time is shown by Δt_60[n] in FIGS. 6A-B.

At box 732, the voltage programmed to the driving transistor decreases a first proportion over the first delay of time. For example, the luminosity graph in FIG. 5A shows the indoor and outdoor luminosity lines decreasing small amount over the Δt_60[n] time period (note that pixel emission is off during Δt_60[n], despite the indoor and outdoor luminosity lines in FIG. 5A being present within this time period).

At box 734, emission of the LED is turned on at a same time that the programming ends, such that the first delay is zero. For example, the time period Δt_60[n] in FIGS. 6A-B may be zero, such that the SCAN falling transition occurs at a same time as the EM falling transition.

At box 740, a determination is made regarding whether to switch to a different refresh rate. For example, if the fast-moving video content is to be presented, the computing device or the display device located therein may determine to switch to a higher refresh rate. If the display device is to not switch refresh rates, the operations of box 700 are performed again. If the display device is to switch to a different refresh rate, the operations of box 760 are performed.

At box 750, the display device operates at a second refresh rate that is different from the first refresh rate. For example, the display device described with respect to FIGS. 1 and 2A-B can operate at a 90 Hz or 120 Hz refresh rate, repeatedly presenting frames, which each include an initialize period, a program period, and an emission period (as shown in FIGS. 2B and 6C).

At box 760, emission of an LED of a pixel is on for a first period of time. For example, Pixel P11 (FIG. 1) may be on for the emission period that is labeled in FIG. 2B, and that is shown without a label in FIG. 6C.

At box 762, the second refresh rate is higher than the first refresh rate. For example, the second refresh rate of 90 Hz or 120 Hz may be higher than the first refresh rate of 60 Hz.

At box 770, emission of the LED of the pixel is turned off. For example, the EM signal (see FIG. 2B) turns "off" by transitioning from low to high. This signal transition causes the LED to stop emitting light, as explained in the description of FIGS. 2A-B. Similar operations are shown by the timing diagram of FIG. 6C.

At box 772, the pixel is initialized. For example, the SCAN[n−1] signal (see FIG. 2B) may initialize various components of the pixel, as described with respect to FIGS. 2A-B. Similar operations are shown by the timing diagram of FIG. 6C.

At box 724, a value is programmed to a driving transistor that drives the LED. For example, the DATA signal (FIG. 2B) may be sent by the VDATA line to the G node of the T1 transistor (FIG. 2A), as described with respect to FIGS. 2A-B. Similar operations are shown by the timing diagram of FIG. 6C.

At box 780, emission of the LED is turned on a second delay of time after the programming of the driving transistor ends, as described with respect to FIGS. 2A-B. An example of such a delay in time is shown by Δt_90[n] in FIG. 6C.

At box 782, the voltage programmed to the driving transistor decreases a second proportion over the second delay of time, with the second proportion being greater than the first proportion. For example, the luminosity graph in FIG. 5A shows the indoor and outdoor luminosity lines decreasing over the Δt_90[n] time period, with a greater proportional decrease than the decrease over the Δt_60[n] time period (note that pixel emission is off during Δt_90[n], despite the indoor and outdoor luminosity lines in FIG. 5A being present within this time period).

At box 784, a peak intensity of LED emission is lower during the second refresh rate than with the first refresh rate, for a same original display pixel value (e.g., 100% programmed intensity in image data before any display or refresh rate specific tuning or calibration). For example, FIG. 5A shows how the initial intensity of the LED at 90 Hz is higher than the initial intensity of the LED at 60 Hz.

At box 790, a determination is made regarding whether to switch to a different refresh rate. For example, if the fast-moving video content has ended and a still image is to be presented, the computing device or the display device located therein may determine to switch to a lower refresh rate. If the display device is to not switch refresh rates, the operations of box 750 are performed again. If the display device is to switch to a different refresh rate, the operations of box 700 are performed.

Figure 8A:
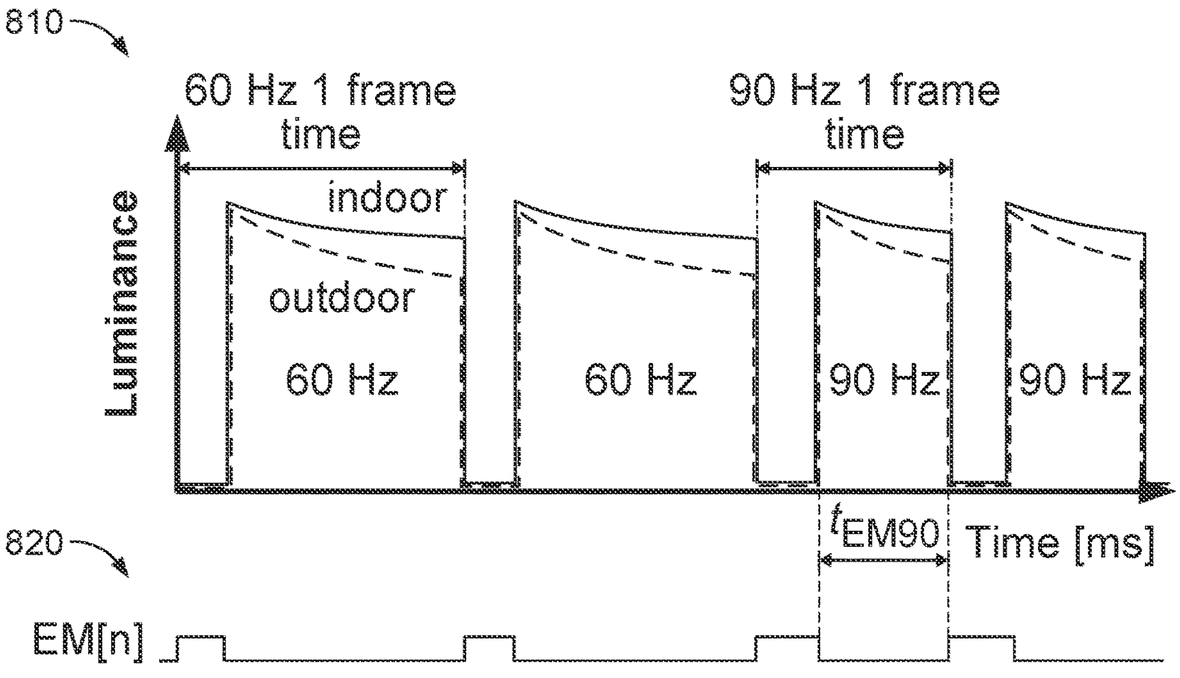
FIG. 8A shows a luminance graph and a corresponding timing diagram.

In some implementations, ambient light detected by a light sensor may be used to trigger changes to characteristics of a refresh period. For example, when a level of ambient light increases, the computing device (e.g., a display device within the computing device) may reduce an emission "on" time in order to mitigate VRR flicker. FIG. 8A shows a luminance graph 810 and a corresponding timing diagram 820. As detected levels of ambient light increase, the computing device may reduce the emission time at 90 Hz ($t_{EM90}$). Since the reduced emission on-time may be relatively small (~0.2 ms out of 11.1 ms for 90 Hz), the OLED lifetime impact may be negligible.

Figure 8B:
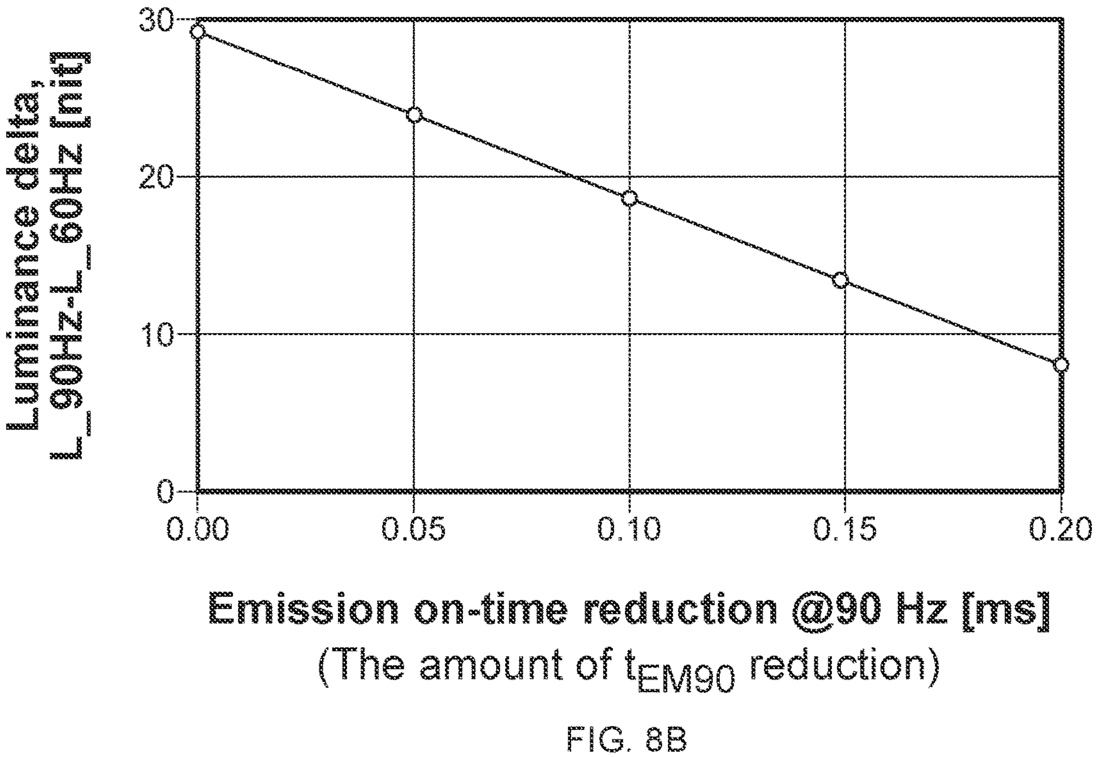
FIG. 8B shows a lookup table used in conjunction with the timing diagram of FIG. 8A.

The amount of reduced emission on-time ($t_{EM90}$) may follow the lookup table of FIG. 8B. The emission "on" time of the low refresh rate, 60 Hz, may not change with changes in detected ambient light levels. For efficiency and accuracy in luminance control, a rising edge of the luminance waveform may be changed, rather than shifting a falling edge of the waveform, when reducing the emission "on" time of high refresh rates. Still, the falling edge of the waveform may be shifted in some implementations.

Figure 9:
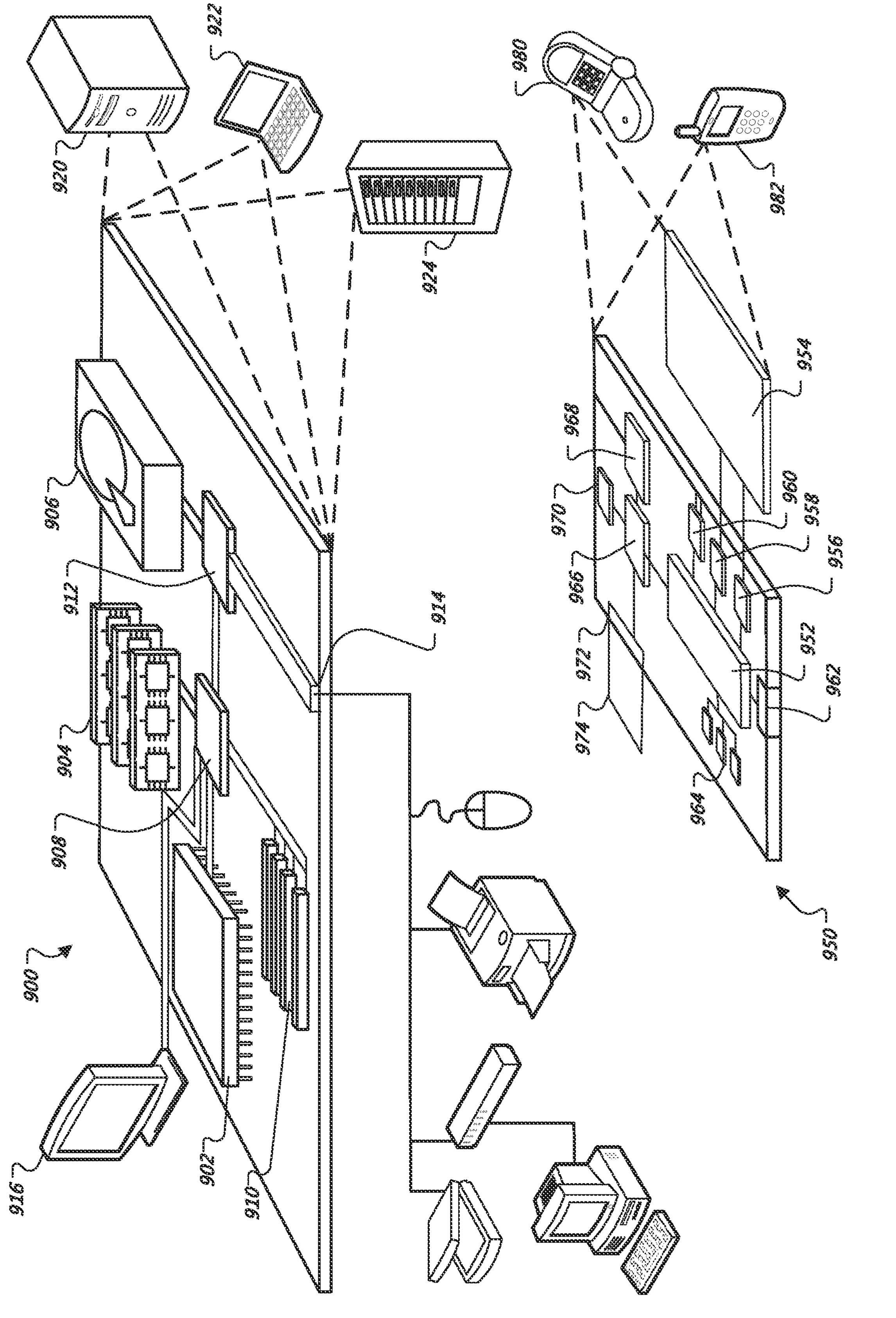
FIG. 9 shows a block diagram of computing devices that may be used to implement the systems and methods described in this document, as either a client or as a server or plurality of servers.

FIG. 9 is a block diagram of computing devices 900, 950 that may be used to implement the systems and methods described in this document, as either a client or as a server or plurality of servers. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 900 includes a processor 902, memory 904, a storage device 906, a high-speed controller 908 connecting to memory 904 and high-speed expansion ports 910, and a low speed controller 912 connecting to low speed expansion port 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high-speed controller 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low speed controller 912 manages lower bandwidth-intensive operations. Such allocation of functions is an example only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provided, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smartphone 982, personal digital assistant, or other similar mobile device.

Additionally computing device 900 or 950 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method of operating a display device, comprising:

refreshing a pixel of the display device, while the display device is operating at a first refresh rate in which emission of an LED of the pixel remains on for a first period of time, including by:
- turning off emission of the LED;
- programming a driving transistor that drives the LED, while the emission of the LED remains off and the display device is operating at the first refresh rate; and
- turning on emission of the LED a first delay of time after the programming of the driving transistor while the display device is operating at the first refresh rate; and refreshing the pixel of the display device, while the display device is operating at a second refresh rate that is higher than the first refresh rate and in which emission of the LED remains on for a second period of time that is shorter than the first period of time, including by:
- turning off emission of the LED;
- programming the driving transistor that drives the LED, while the emission of the LED remains off and the display device is operating at the second refresh rate; and
- turning on emission of the LED a second delay of time after the programming of the driving transistor while the display device is operating at the second refresh rate, the second delay of time being greater than the first delay of time.

2. The method of claim 1, wherein:

the first refresh rate is a 60 Hz refresh rate; and the second refresh rate is a 90 Hz refresh rate or a 120 Hz refresh rate.

3. The method of claim 1, wherein:

programming the driving transistor while the display device is operating at the first refresh rate includes providing a first voltage to a gate of the driving transistor;

the first voltage provided to the gate of the driving transistor decreases a first proportion during the first delay of time after the programming of the LED while the display device is operating at the first refresh rate;

programming the driving transistor while the display device is operating at the second refresh rate includes providing a second voltage to the gate of the driving transistor; and the second voltage provided to the gate of the driving transistor decreases a second proportion during the second delay of time after the programming of the LED while the display device is operating at the second refresh rate, the second proportion being a greater proportion than the first proportion as a result of the second delay of time being greater than the first delay of time.

4. The method of claim 3, wherein:

the first voltage is same as the second voltage as a result of a same intensity level being programmed to the pixel during both the programming of the driving transistor while the display device is operating at the first refresh rate and the programming of the driving transistor while the display device is operating at the second refresh rate;

the LED has a first peak intensity by the upon emission of the LED being turned on after the first voltage is programmed to the gate of the driving transistor while the display device is operating at the first refresh rate;

the LED has a second peak intensity upon emission of the LED being turned on after the second voltage is programmed to the gate of the driving transistor while the display device is operating at the second refresh rate; and the first peak intensity of the LED is greater than the second peak intensity of the LED.

5. The method of claim 3, wherein the emission of the LED turns on at a same time that the programming the driving transistor ends, while the display device is operating at the first refresh rate, such that the first delay of time is zero.

6. The method of claim 1, wherein:

programming the driving transistor, while the display device is operating at the first refresh rate, includes applying a first voltage to a gate of the driving transistor for a programming period of time; and programming the driving transistor, while the display device is operating at the second refresh rate, includes applying a second voltage to the gate of the driving transistor for same said programming period of time.

7. The method of claim 1, wherein:

refreshing the pixel of the display device while the display device is operating at the first refresh rate includes:

(i) a preceding emission of the LED that immediately precedes a refresh of the pixel at the first refresh rate remains on for the first period of time; and (ii) a following emission of the LED that immediately follows the refresh of the pixel at the first refresh rate remains on for the first period of time; and refreshing the pixel of the display device while the display device is operating at the second refresh rate includes:

(i) a preceding emission of the LED that immediately precedes a refresh of the pixel at the second refresh rate remains on for the second period of time; and (ii) a following emission of the LED that immediately follows the refresh of the pixel at the second refresh rate remains on for the second period of time.

8. The method of claim 1, wherein:

refreshing the pixel of the display device, while the display device is operating at the first refresh rate, includes emission of the LED being off for a refresh period of time; and refreshing the pixel of the display device, while the display device is operating at the second refresh rate, includes emission of the LED being off for same said refresh period of time.

9. The method of claim 8, wherein:

the programming of the driving transistor occurs at a first position within the refresh period of time while the display device is operating at the first refresh rate;

the programming of the driving transistor occurs at a second position within the refresh period of time while the display device is operating at the second refresh rate; and the first position is located later within the refresh period of time with respect to the second position.

10. The method of claim 1, wherein:

refreshing the pixel of the display device, while the display device is operating at the first refresh rate, includes emission of the pixel remaining off for a first refresh period of time; and refreshing the pixel of the display device, while the display device is operating at the second refresh rate, includes emission of the pixel remaining off for a second refresh period of time that is greater than the first refresh period of time.

11. The method of claim 10, wherein:

the programming of the driving transistor begins a waiting period of time after the emission of the pixel turns off while the display device is operating at the first refresh rate; and the programming of the driving transistor occurs same said waiting period of time after the emission of the pixel turns off while the display device is operating at the second refresh rate.

12. The method of claim 1, wherein:

programming the driving transistor while the display device is operating at the first refresh rate includes programming the driving transistor for a programming period of time; and programming the driving transistor while the display device is operating at the second refresh rate includes programming the driving transistor for same said programming period of time.

13. The method of claim 1, wherein the first delay of time remains different from the second delay of time regardless various levels of ambient light incident upon a computing device in which the display device is included.

14. The method of claim 1, wherein:

programming the driving transistor while the display device is operating at the first refresh rate is performed after an initializing of the driving transistor to an initialization voltage while the display device is operating at the first refresh rate; and programming the driving transistor while the display device is operating at the second refresh rate is performed after an initializing of the driving transistor to the initialization voltage while the display device is operating at the second refresh rate.

15. The method of claim 1, wherein:

the first delay of time represents a delay of time after the programming of the transistor ends while the display device is operating at the second refresh rate; and the second delay of time represents a delay of time after the programming of the transistor ends while the display device is operating at the second refresh rate.

16. A computing device that comprises:

a display device; and circuitry that accompanies the display device and that is configured to interact with the display device to cause the display device to:

refresh a pixel of the display device, while the display device is operating at a first refresh rate in which emission of an LED of the pixel remains on for a first period of time, including by:

turning off emission of the LED;

programming a driving transistor that drives the LED, while the emission of the LED remains off and the display device is operating at the first refresh rate; and turning on emission of the LED a first delay of time after the programming of the driving transistor while the display device is operating at the first refresh rate; and refresh the pixel of the display device, while the display device is operating at a second refresh rate that is higher than the first refresh rate and in which emission of the LED remains on for a second period of time that is shorter than the first period of time, including by:

turning off emission of the LED;

programming the driving transistor that drives the LED, while the emission of the LED remains off and the display device is operating at the second refresh rate; and turning on emission of the LED a second delay of time after the programming of the driving transistor while the display device is operating at the second refresh rate, the second delay of time being greater than the first delay of time.

17. The computing device of claim 16, wherein:

programming the driving transistor while the display device is operating at the first refresh rate includes providing a first voltage to a gate of the driving transistor;

the first voltage provided to the gate of the driving transistor decreases a first proportion during the first delay of time after the programming of the LED while the display device is operating at the first refresh rate;

programming the driving transistor while the display device is operating at the second refresh rate includes providing a second voltage to the gate of the driving transistor; and the second voltage provided to the gate of the driving transistor decreases a second proportion during the second delay of time after the programming of the LED while the display device is operating at the second refresh rate, the second proportion being a greater proportion than the first proportion as a result of the second delay of time being greater than the first delay of time.

18. The computing device of claim 17, wherein:

the first voltage is same as the second voltage as a result of a same intensity level being programmed to the pixel during both the programming of the driving transistor while the display device is operating at the first refresh rate and the programming of the driving transistor while the display device is operating at the second refresh rate;

the LED has a first peak intensity by the upon emission of the LED being turned on after the first voltage is programmed to the gate of the driving transistor while the display device is operating at the first refresh rate;

the LED has a second peak intensity upon emission of the LED being turned on after the second voltage is programmed to the gate of the driving transistor while the display device is operating at the second refresh rate; and the first peak intensity of the LED is greater than the second peak intensity of the LED.

19. The computing device of claim 16, wherein:

refreshing the pixel of the display device, while the display device is operating at the first refresh rate, includes emission of the LED being off for a refresh period of time; and refreshing the pixel of the display device, while the display device is operating at the second refresh rate, includes emission of the LED being off for same said refresh period of time.

20. The computing device of claim 19, wherein:

the programming of the driving transistor occurs at a first position within the refresh period of time while the display device is operating at the first refresh rate;

the programming of the driving transistor occurs at a second position within the refresh period of time while the display device is operating at the second refresh rate; and the first position is located later within the refresh period of time with respect to the second position.

21. The computing device of claim 16, wherein:

refreshing the pixel of the display device, while the display device is operating at the first refresh rate, includes emission of the pixel remaining off for a first refresh period of time; and refreshing the pixel of the display device, while the display device is operating at the second refresh rate, includes emission of the pixel remaining off for a second refresh period of time that is greater than the first refresh period of time.

22. The computing device of claim 21, wherein:

the programming of the driving transistor begins a waiting period of time after the emission of the pixel turns off while the display device is operating at the first refresh rate; and the programming of the driving transistor occurs same said waiting period of time after the emission of the pixel turns off while the display device is operating at the second refresh rate.

23. The computing device of claim 16, wherein:

programming the driving transistor while the display device is operating at the first refresh rate includes programming the driving transistor for a programming period of time; and programming the driving transistor while the display device is operating at the second refresh rate includes programming the driving transistor for same said programming period of time.

24. The computing device of claim 16, wherein:

the first delay of time represents a delay of time after the programming of the transistor ends while the display device is operating at the second refresh rate; and the second delay of time represents a delay of time after the programming of the transistor ends while the display device is operating at the second refresh rate.

* * * * *